United States Patent [19]
Kamata et al.

[11] 4,406,397
[45] Sep. 27, 1983

[54] CENTRAL AIR CONDITIONING EQUIPMENT

[75] Inventors: Keiji Kamata, Yamato; Hikoshiro Suzuki; Yutaka Fukushi, both of Sagamihara, all of Japan

[73] Assignee: Topre Corporation, Tokyo, Japan

[21] Appl. No.: 336,162

[22] Filed: Dec. 31, 1981

[30] Foreign Application Priority Data

May 25, 1981 [JP] Japan .................................. 56-78995

[51] Int. Cl.³ .......................... F24F 7/00; F25B 29/00
[52] U.S. Cl. ...................................... 236/1 B; 236/49; 236/DIG. 9; 165/16; 165/22
[58] Field of Search ................... 236/49, 1 E, 1 B, 38, 236/DIG. 9; 165/16, 22, 47, 57

[56] References Cited

U.S. PATENT DOCUMENTS

| | | | |
|---|---|---|---|
| 3,482,623 | 12/1969 | Betz | 165/22 |
| 3,674,203 | 7/1972 | McGrath | 236/38 |
| 4,244,517 | 1/1981 | Stanke et al. | 236/49 |
| 4,324,288 | 4/1982 | Karns | 236/1 B |

FOREIGN PATENT DOCUMENTS 55-22696 6/1980 Japan .
55-24022 6/1980 Japan .

Primary Examiner—Albert J. Makay
Assistant Examiner—Harry Tanner
Attorney, Agent, or Firm—Oblon, Fisher, Spivak, McClelland & Maier

[57] ABSTRACT

Central air conditioning equipment which performs air conditioning for a plurality of rooms, comprises a terminal air quantity control unit which is installed in order to communicate with each room and which controls the quantity of the air stream which is distributed to each room through a duct, and an air quantity control device, attached to an air conditioner, which controls a blower to reduce the blown air quantity until at least one of dampers reaches a first position to allow air flow when all of the dampers are not in the first position, which controls the blower to decrease the blown air quantity when an air quantity detected by an air quantity sensor is smaller than an air quantity set by a setter while at least one of the dampers is located in the first position, and which controls the blower to maintain the blown air quantity when the air quantity detected by the air quantity sensor is equal to the air quantity set by the setter.

7 Claims, 17 Drawing Figures

CENTRAL AIR CONDITIONING EQUIPMENT

BACKGROUND OF THE INVENTION

The present invention relates to central air conditioning equipment having a common blower and branched ducts which lead to respective rooms from the common blower and, more particular, central air conditioning equipment having an air quantity control device in each branched duct.

In general, in central air conditioning equipment having no air quantity control device, cool air or warm air which is discharged at constant pressure and at constant air quantity by the blower is distributed to the respective rooms through the respective branched ducts, so that each room is cooled or warmed. Therefore, for example, when the quantity of air for a particular room is to be reduced by a damper in order to lower the temperature in the heating mode, the quantity of air which is distributed to other rooms increases so that the heating temperature in other rooms changes.

In order to solve this problem, air quantity control means which is disclosed in, for example, Japanese Patent Publication No. 55-24,022 and Japanese Patent Publication No. 55-22,696 has been conventionally developed.

In the former Japanese Patent Publication No. 55-24,022, changes of pressure in a common duct between an air conditioner and a terminal air quantity control device are detected, and the blower of the air conditioner is controlled to maintain the pressure at the detection section constant. However, with this control system, the following problem is still unsolved. Channel resistances differ between rooms which are close to the air conditioner and rooms which are away from the air conditioner even if the same quantity of air is exchanged. Therefore, the changes in pressure cause changes in the air quantity at the detection section. In order to obtain the predetermined air quantity, power which is required fo operating the blower cannot be maintained at minimum. In most cases, the blower is operated by excessive power. In this manner, blower operation results in energy loss and much noise in operation.

On the other hand, in Japanese Patent Publication No. 55-22,696, signals which instruct the proper air quantity for each terminal air quantity control device are added, and the addition output signal is supplied to a blower which is thus controlled in response to the above addition output signal. However, the above control system has drawbacks described below. When the total air quantity is changed because of the extension and reconstruction work of a building in which the air conditioning equipment has been installed, the control circuit must be rearranged and resynchronized with the blower. Further, when channel resistances vary from the air conditioner to each terminal air quantity control device, each terminal air quantity control device must be adjusted in accordance with the various channel resistances. This adjustment cannot properly be performed before the air conditioning equipment is installed, resulting in inconvenience.

SUMMARY OF THE INVENTION

The present invention has been made in consideration of above mentioned circumstances and has for its first object to provide central air conditioning equipment with low power consumption and low noise in which proper air quantity for each room is guaranteed against changes in air quantity which is distributed to each room, when cooling or heating of each room is independently controlled, and in which blower power of a blower is controlled to be minimum.

It is a second object of the present invention to provide central air conditioning equipment which properly controls blowing power of a blower and air quantity to each room, regardless of load changes in the cooling or heating operation and changes in the temperature range setting for cooling or heating, by using each terminal air quantity control device as a sensor to control the blower of the air conditioner, selecting one of a plurality of sensors in worst blowing conditions, and controlling the blower of the air conditioner based on the worst blowing conditions.

It is a third object of the present invention to provide central air conditioning equipment which properly controls the blowing power of the blower and the air quantity of each room within the capacity of the air conditioner without performing adjustments such as changes in conditions and control circuits, independently of changes in designing, insulating and partitioning ducts and the extension and reconstruction of the building.

According to one aspect of the present invention, there is provided central air conditioning equipment which performs air conditioning for a plurality of rooms, comprising an air conditioner which includes a heat exchanger and a blower for blowing air, heat of which is exchanged in the heat exchanger; a duct which distributes the air blown from the blower to the rooms; a terminal air quantity control unit which is installed in order to communicate with each room and which controls the quantity of the air which is distributed to each room through the duct, the terminal air quantity control unit including a main body through which the air passes, an air quantity sensor which detects a flow rate of the air which passes through the main body, a damper which is disposed in the main body and which is movable between a first position to allow air flow and a second position to interrupt the air flow, a drive mechanism which drives the damper, a setter which is disposed in a corresponding room and which sets the quantity of the air which is distributed to the corresponding room, and a unit controller which controls the drive mechanism in order to match the quantity of the air which actually passes with the quantity of air which is set, based on the air quantity detected by the air quantity sensor and the air quantity set at the setter; and an air quantity control device, attached to the air conditioner, which controls the blower to reduce the blown air quantity until at least one of the dampers the reaches a first position when all of the dampers are not in the first position, which controls the blower to decrease the blown air quantity when the air quantity detected by the air quantity sensor is smaller than the air quantity set by the setter while at least one of the dampers is located in the first position, and which controls the blower to maintain the blown air quantity when the air quantity detected by the air quantity sensor is equal to the air quantity set by said setter.

The following effects are accomplished by the central air conditioning equipment according to the present invention;

(A) The quantity of cool air/warm air which is discharged to each branched duct is controlled to a desired quantity by a corresponding terminal air quantity control unit. The air quantity is thus controlled by the terminal air quantity control unit so that the air quantity which is discharged to each room is precisely maintained at the air quantity set by the setter.

(B) Even if the air quantity of a particular room is changed, the air quantities of the other rooms are controlled by their respective terminal air quantity control units. Therefore, the air quantities of the other rooms are maintained constant.

(C) Even if channel resistance in the downstream of a duct is changed due to changes in the duct, and position of the supply opening, or due to clogging of the filter, the corresponding terminal air quantity control unit need not be changed. Further, since the quantity of air which passes through each branched duct is controlled by its own terminal air quantity control unit, changes which are caused by the trouble described above are thus eliminated.

(D) Since an air quantity control device uses each terminal air quantity control unit as a sensor for controlling the operation of the blower, a separate sensor is not required.

(E) In the control for operating the blower, a terminal air quantity control unit whose blowing conditions are worst among the blowing conditions of other terminal air quantity control units is selected, that is, a terminal air quantity control unit whose damper is fully opened is first selected. Based on the operating conditions of this terminal air quantity control unit, the blower is so controlled that a control signal for the blower is easily received and instructions for the blower are quickly performed. Therefore, changes in operating conditions of this control result in signals to which the blower can quickly respond.

(F) Since the blower is always operated to blow the minimum air quantity which is required, unnecessary power is not required, resulting in lower power consumption and low noise.

(B) Even if channel resistance changes, when changes in channels of the branched ducts are made because of partitioning a room at the time of extension or reconstruction of a building, these resistance changes are not extended to other rooms and proper air quantity control is provided as long as these changes are performed within the range of the flowing capacity of the blower.

DETAILED DESCRIPTION OF THE PREFERRED EMBODIMENTS

Central air conditioning equipment according to one embodiment of the present invention will be described with reference to FIGS. 1 to 6.

Figure 1:
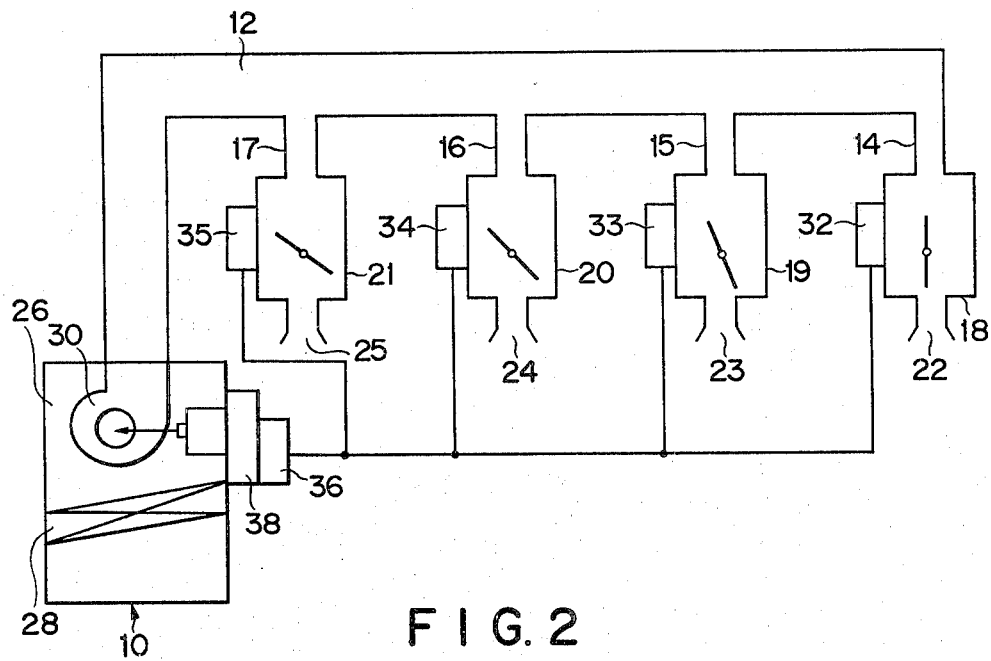
FIG. 1 is a schematic view illustrating the overall structure of central air conditioning equipment according to one embodiment of the present invention.

FIG. 1 shows a schematic construction of central air conditioning equipment according to one embodiment of the present invention. The central air conditioning equipment comprises an air conditioner 10, a common duct 12 which is connected to the air conditioner 10, a plurality of branched ducts, four branched ducts 14, 15, 16 and 17 in this embodiment, which are, respectively, connected to the common duct 12, terminal air quantity control units 18, 19, 20 and 21 which are, respectively, connected to outlet ports of the branched ducts 14, 15, 16 and 17, and supply openings 22, 23, 24 and 25 which are, respectively, connected to the terminal air quantity control units 18, 19, 20 and 21. The supply openings 22, 23, 24 and 25 open to corresponding rooms (not shown) in which air conditioning is performed.

The air conditioner 10 has an air conditioner main body 26. A heat exchanger 28 is disposed in the air conditioner main body 26. The heat exchanger 28 exchanges heat with air which passes therethrough, so that the air is warmed or cooled. A blower 30 is disposed in a position of the air conditioner main body 26 where the common duct 12 opens. The blower 30 blows warm air/cool air to the common duct 12 through the heat exchanger 28. The blower 30 is driven by an induction motor 31.

Unit control devices 32, 33, 34 and 35 are, respectively, disposed at the terminal air quantity control units 18, 19, 20 and 21. The unit control devices 32 to 35 operate the corresponding terminal air quantity control units 18 to 21 to maintain the air quantity at a predetermined value and supply a control signal which indicates the control conditions of the corresponding terminal air quantity control units 18 to 21 to an inverter controller 36 as the air quantity control device. The inverter controller 36, to be described later, is attached to the air conditioner main body 26. Further, the inverter controller 36 is connected to an inverter 38 which controls the rotational frequency of the induction motor 31 which, in turn, controls the rotational frequency of the induction motor 31 which, in turn, drives the blower 30. The inverter controller 36 controls the inverter 38 so as to operate the blower 30 at required minimum power in a process to be described later.

The arrangement of the terminal air quantity control units 18 to 21 will be described. The terminal air quantity control units 18 to 21 are of the same arrangement. Therefore, the description is limited to the arrangement of the first terminal air quantity control unit 18, and the description of the other units 19 to 21 will be omitted.

Figure 2:
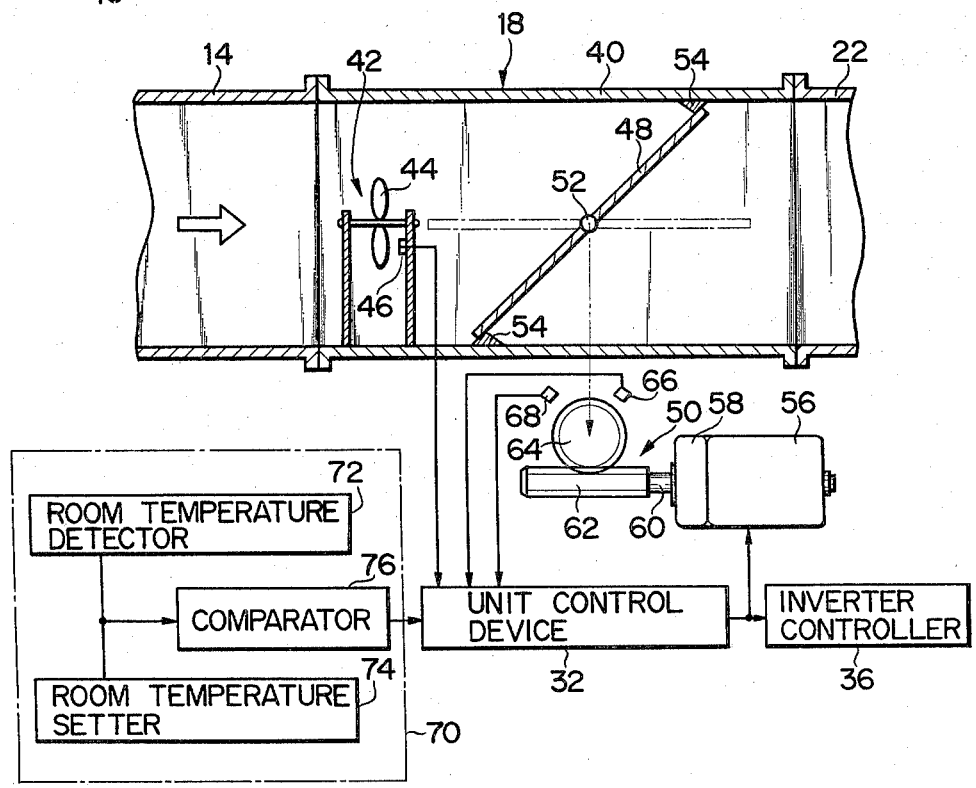
FIG. 2 is a sectional view of a terminal air quantity control unit which is taken out of the central air conditioning equipment of FIG. 1.

Referring to FIG. 2, the first terminal air quantity control unit 18 has a unit duct 40. One of openings of the unit duct 40 communicates with the corresponding branched duct 14 and the other opening thereof communicates with the corresponding supply opening 22. In particular, air which is cooled/warmed and which is supplied from the blower 30 passes from one opening to the other opening in the unit duct 40, in the direction indicated by an arrow.

An air quantity detector 42 is disposed in the upstream of the unit duct 40. The air quantity detector 42 detects the flow rate of air stream which passes through the unit duct 40 and supplies an air quantity signal which has detected flow rate data to the corresponding unit control device 32. The air quantity detector 42 comprises a propeller 44 which is rotatably arranged substantially at the center of the unit duct 40 and whose rotational frequency changes in accordance with the velocity of air stream which passes through the unit duct 40 and a rotational frequency detecting element 46 which detects the rotational frequency of the propeller 44. With this arrangement, the velocity of air stream which passes through the unit duct 40 is detected, so that the air quantity is indirectly detected.

In the downstream of the unit duct 40, is arranged a damper 48 which damps an air channel within the unit duct 40. The damper 48 is constructed by, for example, a plate valve which is driven by a drive mechanism 50. The damper 48 includes a driven shaft 52 extends horizontally at the center thereof. The driven shaft 52 is perpendicular to the flow direction of air in the unit duct 40. The damper 48 is pivotal about the driven shaft 52. The damper 48 completely interrupts air flow at a 45° inclined position from the horizontal direction (indicated by the solid line in FIG. 2) and allows complete air flow substantially at the horizontal position (indicated by the alternate long and two dashed line in FIG. 2). A pair of stoppers 54 which come in contact with both end faces of the damper 48 are disposed at predetermined positions on the upper and lower inner surfaces of the unit duct 40.

The drive mechanism 50 which drives the damper 48 has a reversible motor 56. The motor 56 includes a gear head 58 which has a reduction gear mechanism. A drive shaft 60 which is rotated by the drive force of the motor 56 extends from the gear head 58. The drive shaft 60 has a rotary axis which extends along the direction of the air flow in the unit duct 40. At the top of the drive shaft 60, a worm gear 62 is disposed coaxially therewith. A worm wheel 64 intermeshes with the worm gear 62. The worm wheel 64 is fixed at one end of the driven shaft 52 and coaxial therewith. The motor 56 is controlled by the unit control device 32.

A pair of lead switches 66 and 68 which function as detectors and which are spaced apart at a predetermined distance are arranged at predetermined positions around the worm wheel 64. When the damper 48 is fully opened, that is, when pressure loss of the air stream which passes through the damper 48 is minimized, the lead switch 66 functions as a fully-open position detector. The lead switch 68 functions as the completely-closed position detector when the damper 48 is in the completely-closed position. In this embodiment, the lead switch is used to function as the detector. However, a limiter switch may also be used for this purpose. The fully-open position of the damper 48, as described above, does not indicate the horizontal position, but here means the position which performs the maximum opening area in the unit duct 40.

Further, a room thermostat 70 is connected to the unit control device 32. The room thermostat 70, as shown in FIG. 2, comprises a room temperature detector 72 which detects the room temperature of a corresponding room at current time, a room temperature setter 74 which sets a desired room temperature, and a comparator 76 which compares the room temperature which is detected by the room temperature detector 72 and the room temperature which is set by the room temperature setter 74. The comparator 76, based on the comparing operation, supplies a thermostat signal which indicates air quantity data required to eliminate the temperature difference between the detected temperature and the setting temperature to the corresponding unit control device 32.

Figure 3:
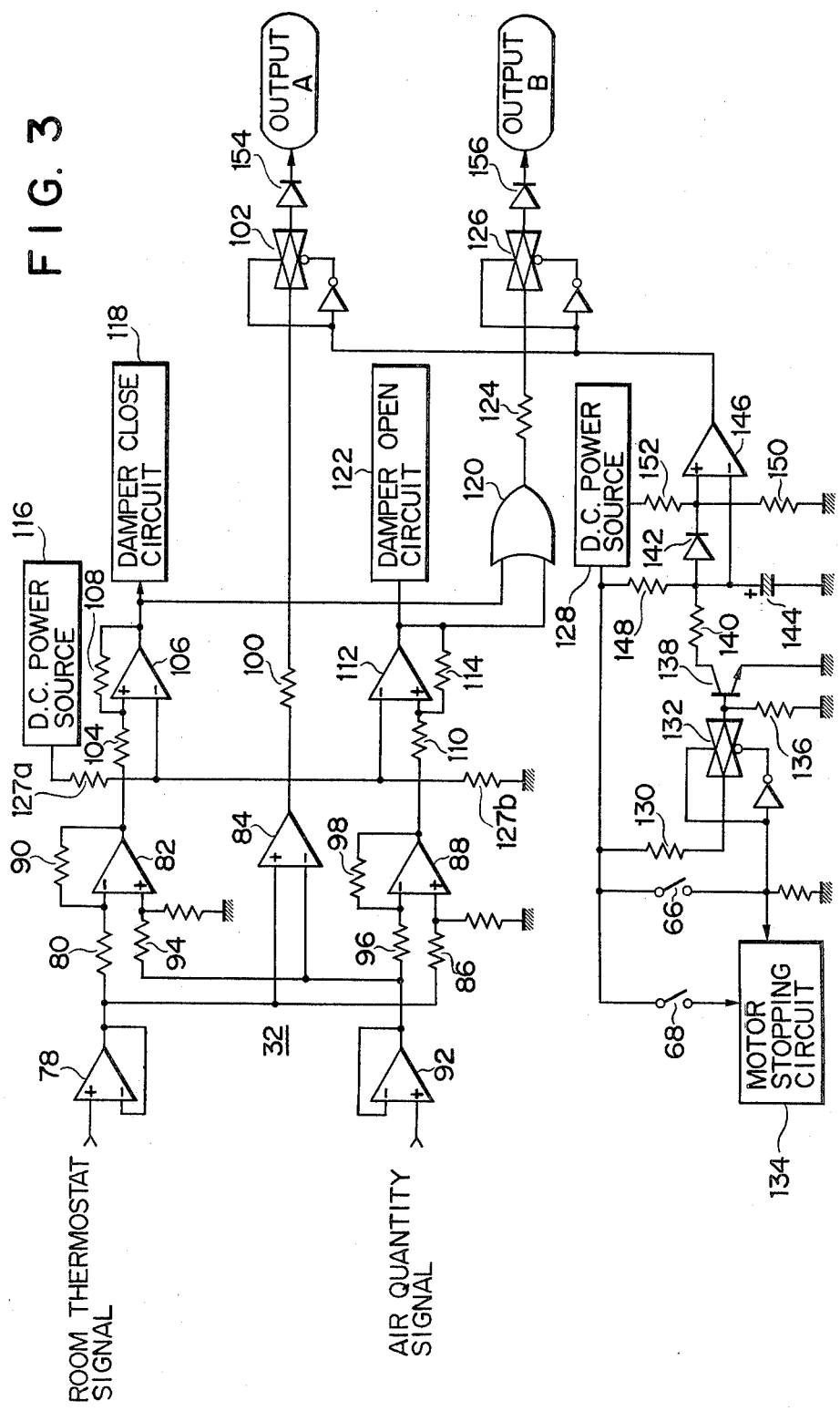
FIG. 3 is a circuit diagram of a unit controller which is employed for the terminal air quantity control unit.

The unit control device 32 has an arrangement the detail of which is shown in FIG. 3. The unit control device 32 generates a signal of high level ("H") and a signal of low level ("L") in accordance with logical results, as shown in Table 1, from outputs A and B of the unit control device 32. Referring to Table 1, symbol P denotes the pieces of data which are represented by the air quantity signal and symbol T denotes the pieces of data which are represented by the room thermostat signal as described above.

TABLE 1

| Output | A | | | B | | |
|---|---|---|---|---|---|---|
| Dampers | Not fully | Fully open | | Not fully | Fully open | |
| Condition | Open | T < P | T > P | Open | P ≠ T | P = T |
| Output level | "L" | "L" | "H" | "L" | "H" | "L" |

Referring to FIG. 3, the room thermostat 70 is connected to a non-inverting input terminal of a first operational amplifier 78 (to be referred to as a first OP Amp. hereinafter). An inverting input terminal of the first OP Amp. 78 and an output terminal thereof are connected to each other. The output terminal of the first OP Amp. 78 is connected to an inverting input terminal of a second OP Amp. 82 through a resistor 80, a non-inverting input terminal of a third OP Amp. 84 and a non-inverting input terminal of a fourth OP Amp. 88 through a resistor 86. The inverting input terminal of the second OP Amp. 82 and the output terminal thereof are connected to each other through a resistor 90. The resistors 80 and 90 form a negative feedback circuit of the second OP Amp. 82.

On the other hand, the air quantity detector 42 is connected to a non-inverting input terminal of a fifth OP Amp. 92. An inverting input terminal of the fifth OP Amp. 92 and an output terminal thereof are connected to each other. The output terminal of the fifth OP Amp. 92 is connected to the non-inverting input terminal of the second OP Amp. 82 through a resistor 94, an inverting input terminal of the third OP Amp. 84 and the inverting input terminal of the fourth OP Amp. 88 through a resistor 96. The inverting input terminal of the fourth OP Amp. 88 and the output terminal thereof are connected to each other through a resistor 98. The resistors 96 and 98 form a negative feedback circuit of the fourth OP Amp. 88.

The output terminal of the third OP Amp. 84 is connected to an input terminal of a first bilateral switch 102 through a resistor 100. The third OP Amp. 84 functions as a comparator. When the non-inverting input terminal of the third OP Amp. 84 receives a signal whose level is higher than a signal which is input to the inverting input terminal thereof, the third OP Amp. 84 outputs a signal of high level. Otherwise, the third OP Amp. 84 outputs the signal of low level in the case of a inverse condition. In the other words, when the room thermostat signal T is higher than the air quantity signal P, the third OP Amp. 84 outputs the signal of high level. On the other hand, when the room thermostat signal T is smaller than the air quantity signal P, the third OP Amp. 84 outputs the signal of low level. The first bilateral switch 102 is turned on only when a signal of high level is input to a control input terminal of the bilateral switch 102. The first bilateral switch 102 outputs a signal of high level or a signal of low level in correspondence with the input signal of high or low level. When the signal of low level is input to the control input terminal of the first bilateral switch 102, the first bilateral switch 102 is turned off, so that the condition in which the signal of low level is output is realized even if the signal of low level or the signal of high level is input to the input terminal of the first bilateral switch 102 because a resistor 164 of FIG. 4 to be described later is grounded.

The output terminal of the second OP Amp. 82 is connected to a non-inverting input terminal of a sixth OP Amp. 106 through a resistor 104. The non-inverting input terminals of the sixth OP Amp. 106 and an output terminal thereof are connected together through a resistor 108. The output terminal of the fourth OR Amp. 88 is connected to a non-inverting input terminal of a seventh OP Amp. 112 through a resistor 110. The non-inverting input terminal of the seventh OP Amp. 112 and an output terminal thereof are connected to each other through a resistor 114. The inverting input terminals of the sixth and seventh OP Amps. 106 and 112 are connected to a common DC power source 116 which has a predetermined output voltage through a resistor 126a. The inverting input terminals of the sixth and seventh OP Amps. 106 and 112 are grounded through a resistor 127b. The output terminal of the sixth OP Amp. 106 is connected to a damper close circuit 118 and one input terminal of a first OR gate circuit 120. The output terminal of the seventh OP Amp. 112 is connected to a damper open circuit 122 and the other terminal of the first OR gate circuit 120. When the damper close circuit 118 receives a signal of high level, the damper close circuit 118 drives the motor 56 to make the damper 48 further close the unit duct 40. On the other hand, when the damper open drive circuit 122 receives a signal of high level, the damper open circuit 122 drives the motor 56 to make the damper 48 further open the unit duct 40. When the signal of low level is supplied to the damper close circuit 118 and the damper open circuit 122, the motor 56 stops rotating so that the damper 48 is maintained at the current position. An output terminal of the first OR gate circuit 120 is connected to an input terminal of a second bilateral switch 126 through a resistor 124. The second bilateral switch 126 is arranged in the same manner as the first bilateral switch 102.

The first and fifth OP Amps. 78 and 92 function as voltage followers which amplify an input signal at an amplification factor of 1 and output an output signal to the next stage. The second and fourth OP Amps. 82 and 88 function as differential amplifiers which amplify a potential difference between the two input terminals through the ratio of the resistors 80 and 90, and the ratio of the resistors 96 and 98, respectively and output an output signal to the next stage. For example, in the second OP Amp. 82, when the output from the fifth OP Amp. 92 is higher than that from the first OP Amp. 78, a difference therebetween is amplified and is output. On the other hand, when the output from the fifth OP Amp. 92 is lower than that from the first OP Amp. 78, the second OP Amp. 82 outputs a signal at the zero potential. Further, in the fourth OP Amp. 88, for example, when the output from the fifth OP Amp. 92 is higher than that from the first OP Amp. 78, the fourth OP Amp. 88 outputs the signal at the zero potential. On the other hand, when the output from the fifth OP Amp. 92 is lower than that from the first OP Amp. 78, the fourth OP Amp. 88 outputs a signal whose potential difference is amplified.

The sixth OP Amp. 106 or the seventh OP Amp. 112 functions as a comparator with hysteresis. When the voltage which is output from the second OP Amp. 82 is higher than a predetermined voltage which is obtained by voltage-dividing between the voltage of the DC power source 116 and the zero potential through resistors 127a and 127b, the sixth OP Amp. 106 outputs the signal of high level. Otherwise, the sixth OP Amp. 106 outputs the signal of low level in the case of a reverse condition. When a voltage which is output from the fourth OP Amp. 88 is higher than the predetermined voltage through the resistors 127a and 127b, as described above, the seventh OP Amp. 112 outputs the signal of high level. Otherwise, the seventh OP Amp. 112 outputs the signal of low level in the case of a reverse condition.

However, as described above, the sixth and seventh OP Amp. 106 and 112 function as the comparators with hysteresis. Therefore in order to invert the level of the signal from high level to low level in the sixth and seventh OP Amps. 106 and 112, the voltage which is output from the second OP Amp. 82 or the voltage which is output from the fourth OP Amp. 88 must be lowered to establish a potential difference which is determined by a resistance ratio of the resistor 104 and the resistor 108 or a resistance ratio of the resistor 110 and the resistor 114 with reference to the predetermined voltage supplied through the DC power source 116 and the resistors 127a and 127b. When the signals of low level are supplied from the sixth and seventh OP Amps. 106 and 112 to the OR gate circuit 120, the OR gate circuit 120 outputs a signal of low level. When one of the signals which are supplied from the sixth and seventh OP Amps. 106 and 112 is of high level, the OR gate circuit 120 outputs a signal of high level. In other words, when the room thermostat signal T is equal to the air quantity signal P, the OR gate circuit 120 outputs the signal of low level. Otherwise, the OR gate circuit 120 outputs the signal of high level. In order to prevent an operation in which signals of high level are simultaneously output from the sixth and seventh OP Amp. 106 and 112, the ratio of the resistance of the resistor 104 to that of the resistor 108, the ratio of the resistance of the resistor 110 to that of the resistor 114 and the ratio of the resistance of the resistor 127a that of to the resistor 127b are determined for this purpose.

On the other hand, another DC power source 128 is arranged in addition to the DC power source 116 as described above. This DC power source 128 has first and second output terminals. The first output terminal of the DC power source 128 is connected to an input terminal of a third bilateral switch 132 through a resistor 130, one terminal of the lead switch 66 which functions as the fully-open position detector and one terminal of the lead switch 68 which functions as the completely-closed position detector. The other terminal of the lead switch 66 is connected to a motor stopping circuit 134 and a control input terminal of the third bilateral switch 132. The other terminal of the lead switch 68 is connected to the motor stopping circuit 134. When the lead switch 66 is turned on, that is, when the damper 48 is set in the fully-open position, the motor stopping circuit 134 operates to stop rotating the motor 56 in order to interrupt the operation for opening the damper 48. Further, when the lead switch 68 is turned on, that is, the damper 48 is set in the completely-closed position, the motor stopping circuit 134 operates to stop rotating the motor 56 in order to interrupt the operation for closing the damper 48. The third bilateral switch 132 has the same arrangement as the first bilateral switch 102.

The output terminal of the third bilateral switch 132 is grounded through a resistor 136 and connected to a base of an npn transistor 138. An emitter of the npn transistor 138 is grounded, and a collector thereof is connected to an anode of a diode 142 through a resistor 140, and anode of an electrolytic capacitor 144, and an inverting input terminal of an eighth OP Amp. 146. The cathode of the electrolytic capacitor 144 is grounded. The first output terminal of the DC power source 128 is connected to the anode of the diode 142 through a resistor 148. A cathode of the diode 142 is connected to a non-inverting input terminal of the eighth OP Amp. 146 and is grounded through a resistor 150. The second output terminal of the DC power source 128 is connected to the non-inverting input terminal of the eighth OP Amp. 146 through a resistor 152. The eighth OP Amp. 146 functions as a comparator. When the non-inverting input terminal of the eighth OP Amp. 146 receives a signal whose level is higher than that which is supplied to the inverting input terminal thereof, the eighth OP Amp. 146 outputs the signal of high level. Otherwise, the eighth OP Amp. 146 outputs the signal of low level.

The output terminal of the eighth OP Amp. 146 is connected to the control input terminals of the first and second bilateral switches 102 and 126. When the lead switch 66 is turned on, the motor 56 stops rotating. At the same time, the voltage is applied to the control input terminal of the third bilateral switch 132 so that the third bilateral switch 132 is rendered conductive. As a result, a bias current flows from the DC power source 128 to the npn transistor 138 through the resistor 130 so that the npn transistor 138 is rendered conductive. Therefore, the charge which is stored on the electrolytic capacitor 144 is discharged through the resistor 140 and the npn transistor 138. As a result, a voltage which is obtained by voltage-dividing the output voltage from the second output terminal of the DC power source 128 through resistors 150 and 152 is supplied to the non-inverting input terminal of the eighth OP Amp. 146. On the other hand, since the inverting input terminal of the eighth OP Amp. 146 is connected between the electrolytic capacitor 144 which is being discharged and the resistor 148, a voltage which is higher than a voltage which is input to the inverting input terminal is applied to the non-inverting input terminal. In this manner, when the lead switch 66 is turned on, the eighth OP Amp. 146 outputs the signal of high level.

When the lead switch 66 is turned off, the voltage is not applied to the control input terminal of the third bilateral switch 132 so that the third bilateral switch 132 is rendered non-conductive. Therefore, the bias voltage is not applied to the base of the npn transistor 138, so that the npn transistor 138 is rendered nonconductive. The electrolytic capacitor 144 stops discharging and is charged by the output voltage from the first output terminal of the DC power source 128 through the resistor 148. When the electrolytic capacitor 144 is charged for a predetermined period of time, a voltage which is lower than a voltage which is applied to the inverting input terminal is applied to the non-inverting input terminal of the eighth OP Amp. 146. In this manner, when the lead switch 66 is turned off, the eighth OP Amp. 146 outputs the signal of low level. In the fully-open position of the damper 48, the eighth OP Amp. 146 outputs the signal of high level. On the other hand, in the not-fully open position, the eighth OP Amp. 146 outputs the signal of low level. Therefore, the first and second bilateral switches 102 and 126, in the fully-open position of the damper 48, receive the signal of high level or low level and output it as it is. However, in the not fully-open position, even if the signal of high level or low level is input to the first and second bilateral switches 102 and 126, they restore the condition in which the signal of low level is constantly output, since a resistors 164 and 166 of FIG. 4 to be described later are grounded.

The output terminals of the first and second bilateral switches 102 and 126 are, respectively, connected to anodes of first and second diodes 154 and 156. The output A and the output B are supplied from the cathodes of the first and second diodes 154 and 156. In this manner, the logical results as shown in Table 1 are accomplished.

Output lines for the output A and the output B from the unit control devices 32 to 35 are connected with a "Wired OR" structure to the common inverter controller 36. In binding a plurality of output lines, the "wired OR" structure is defined as a structure in which if at least one output line outputs the signal of high level regardless of the level of other output lines, the circuit as a whole outputs the signal of high level. However, if all of the output lines output the signals of low level, the circuit as a whole outputs the signal of low level.

The detail of the inverter controller 36 will be described with reference to FIG. 4. The inverter controller 36 outputs a control signal for controlling the inverter 38, in response to the level signal of high and/or low level from the outputs A and B, based on the logical results as shown in Table 2.

TABLE 2

| Input | A | "H" | "H" | "L" | "L" |
|---|---|---|---|---|---|
| level | B | "H" | "L" | "H" | "L" |
| Control signal | | Up | hold | down | down |

Figure 4:
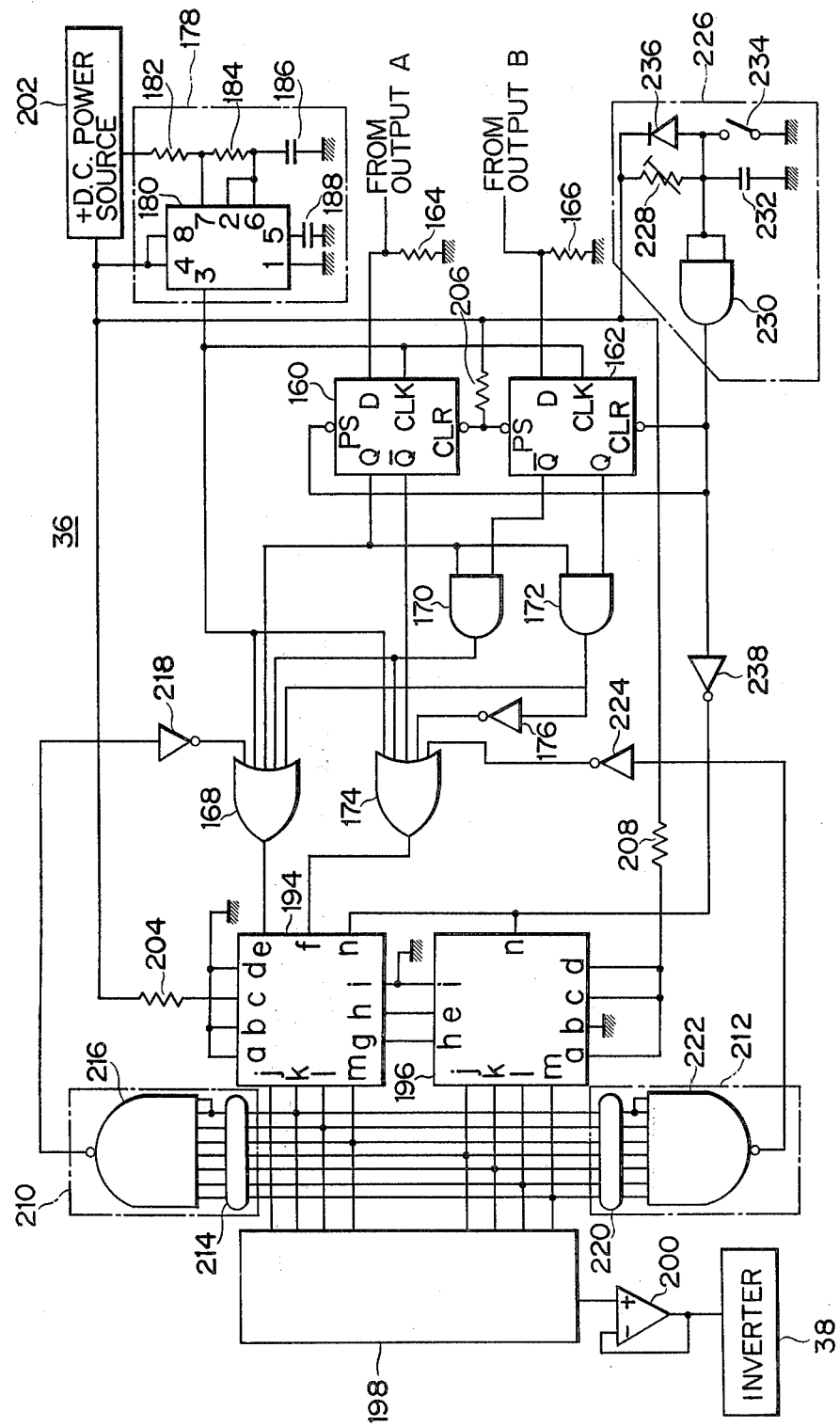
FIG. 4 is a circuit diagram of an inverter controller which is employed for the air quantity control device.
Figure 5:
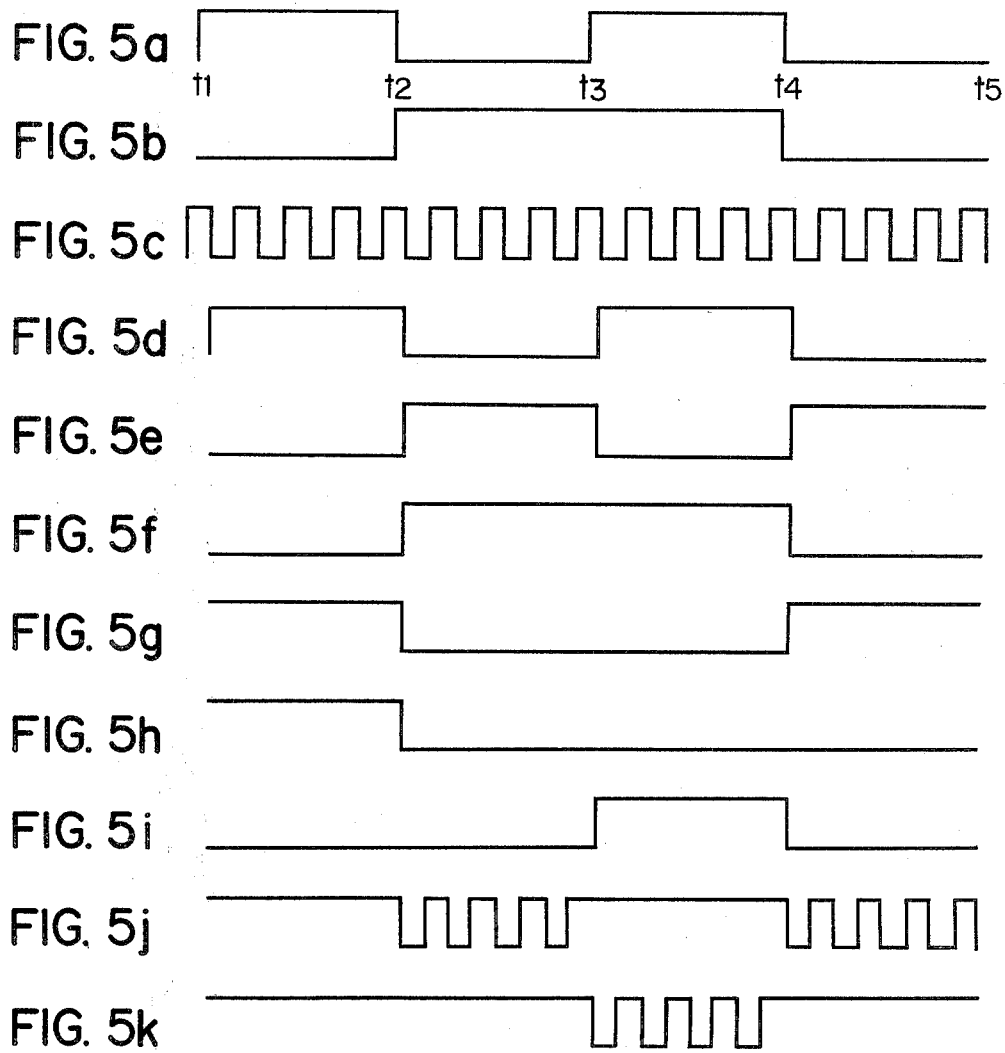
FIGS. 5a to 5k are timing charts for explaining the mode of operation of the inverter controller of FIG. 4, respectively.
Figure 6:
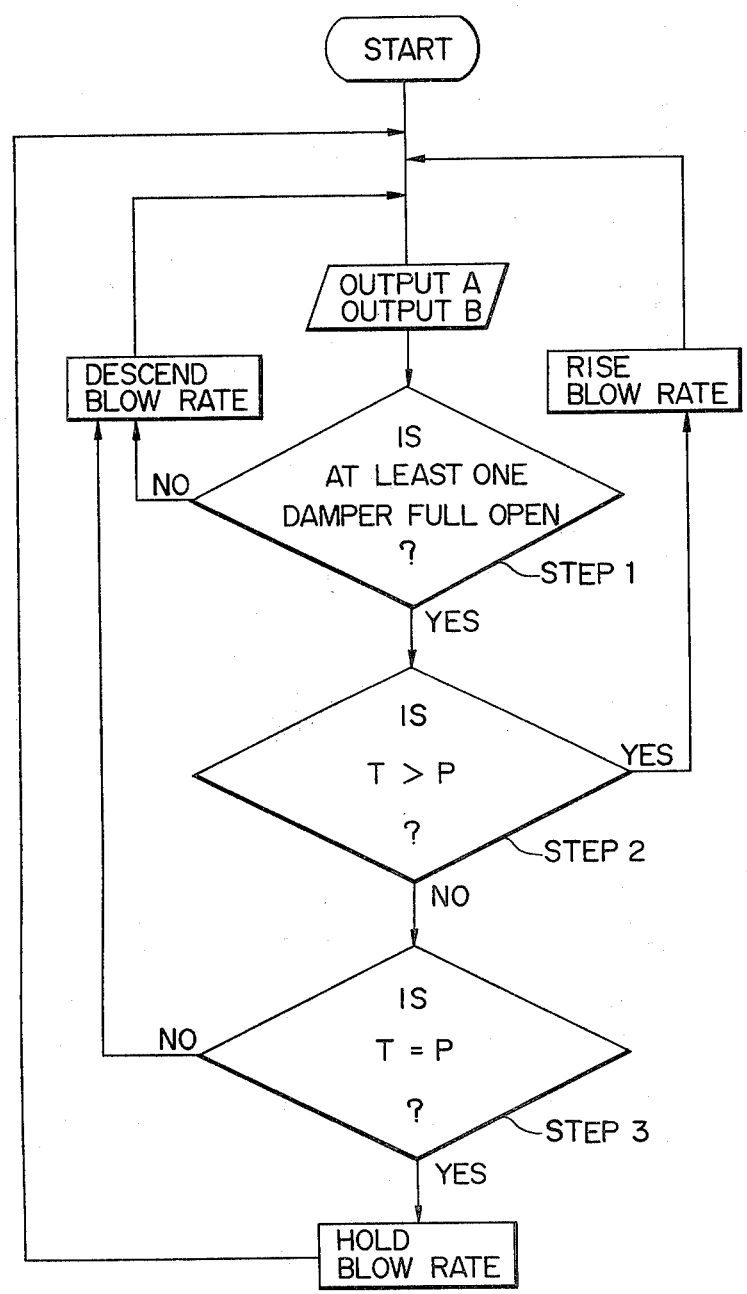
FIG. 6 is a flow chart for explaining the mode of control operation of the equipment.

The output A as shown in FIG. 3 is connected to an input terminal D of a first D type flip-flop 160, and the output B is connected to an input terminal D of a second D flip-flop 162, as shown in FIG. 4. The connecting wires of the first and second D type flip-flops 160 and 162 are grounded, respectively, through resistors 164 and 166. A first output terminal Q of the first D type flip-flop 160 is connected to a first input terminal of a second OR gate circuit 168 which has five input terminals, one of the input terminals of a first AND gate circuit 170, and one of the input terminals of a second AND gate circuit 172. A second output terminal Q of the first D type flip-flop 160 is connected to a first input terminal of a third OR gate circuit 174 which has five input terminals. On the other hand, first output terminal Q of the second D type flip-flop 162 is connected to the other input terminal of the second AND gate circuit 172, and the second output terminal $\overline{Q}$ thereof is connected to the other input terminal of the first AND gate circuit 170.

The output terminal of the first AND gate circuit 170 is connected to second input terminals of the second and third OR gate circuits 168 and 174, respectively. The output terminal of the second AND gate circuit 172 is connected to the third input terminal of the second OR gate circuit 168 and the third input terminal of the third OR gate circuit 174 through an inverter 176.

The inverter controller 36 includes a clock generator 178. The clock generator 178 comprises an IC 180 which has a timer function, and two resistors 182 and 184 and two capacitors 186 and 188 which are connected to the IC 180. By arbitrarily selecting resistances of resistors 182 and 184 and capacitances of the capacitors 186 and 188, the pulse width and frequency of a clock pulse which is output from a clock output terminal 3 of the IC 180 are defined. The clock output terminal 3 of the IC 180 is connected to clock input terminals CLK of the first and second D type flip-flops 160 and 162 and the fourth input terminals of the second and third OR gate circuits 168 and 174, respectively.

The output terminals of the second and third OR gate circuits 168 and 174 as described above are, respectively, connected to a count-down input terminal e and a count-up input terminal f of a first up/down counter 194. The first up/down counter 194 is constructed by a presettable synchronous up/down 4-bit counter IC. By combining the first up/down counter 194 and a second up/down counter 196 with the same arrangement, an 8-bit up/down counter is constituted. A carry output terminal g and a borrow output terminal h of the first up/down counter 194 are, respectively, connected to a count-up input terminal b and a count-down input terminal e of the second up/down counter 196. Clear input terminals i of the first and second up/down counters 194 and 196 are connected together and are grounded. First, second, and fourth preset input terminals a, b and d of the first up/down counter 194 and a second preset input terminal b of the second up/down counter 196 are, respectively, grounded.

Each up/down counter 194 or 196 counts down a digital value which is output in response to the number of pulse signals which are input to the count-down input terminal e, and counts up the digital value which is output in response to the number of pulse signals which are input to the count-up input terminal f. When a pulse signal is not input to the count-down input terminal e and the count-up input terminal f, that is, when a signal of constant level is input, the digital value at the current time is retained and output by the up/down counter 194 or 196.

First to fourth output terminals j, k, l and m of the first up/down counter 194 define first to fourth bits of 8-bit data. The outputs from the first to fourth output terminals j, k, l and m of the first up/down counter 194 are input to first to fourth input terminals of a D/A converter 198, respectively. First to fourth output terminals j, k, l and m of the second up/down counter 196 define fifth to eighth bits of the 8-bit data. The outputs from the first to fourth output terminals j, k, l and m of the second up/down counter 196 are input to fifth to eighth input terminals of the D/A converter 198. The D/A converter 198 converts the input digital value to an analog value. For example, when a binary coded signal of "00000000" of 8 bits is input to the D/A converter 198, the D/A converter 198 outputs 0 V (DC). On the other hand, when a binary coded signal of "11111111" of 8 bits is input to the D/A converter 198, the D/A converter 198 outputs 10 V (DC). In this manner, the D/A converter 198 outputs a DC voltage in the range of 0 to 10 V in proportion to the digital signal of 8 bits. The output terminal of the D/A converter 198 is connected to a non-inverting input terminal of a ninth OP Amp. 200. An output terminal of the ninth OP Amp. 200 is connected to an inverting input terminal thereof and the input terminal of the inverter 38. Thus, the output terminal of the ninth OP Amp. 200 is defined as the output terminal of the inverter controller 36. The inverter 38 converts an AC current to a DC current, and performs the on/off operation of the converted DC current at high speed in proportion to the DC voltage which is output from the D/A converter 198 as the control signal of the inverter 38. The inverter 38 outputs an apparent AC current of 0 to 60 Hz. The inverter 38 is connected to the induction motor 31 for blowing, as described above.

A DC power source 202 is connected to the inverter controller 36. That is, an output terminal of the DC power source 202 is connected to a third preset input terminal c of the first up/down counter 194, a reset terminal 4 and a Vcc terminal 8 of the IC 180, the clear input terminal CLR of the first D type flip-flop 160 and the preset input terminal PS of the second D type flip-flop 162 through a common resistor 206, the first, third and fourth preset input terminals a, c and d of the second up/down counter 196 through a common resistor 208. Therefore, when power is supplied, the signal of high level is supplied to the clear input terminal CLR of the first D type flip-flop 160 and the preset input terminal PS of the second D type flip-flop 162.

Lower and upper limiters 210 and 212 are connected to the inverter contoller 36. In the lower limiter 210, the second to the fourth output terminals k, l and m of the first up/down counter 194 and the first to fourth output terminals j, k, l and m of the second up/down counter 196 are, respectively, connected to the second to eighth input terminals of a first NAND gate circuit 216, which has 8 input terminals through, a first switch circuit 214. The first switch circuit 214 is not shown in detail but it has series circuits of inverters and changeover switches. The first input terminal of the first NAND gate circuit 216 is connected to the second input terminal thereof. An output terminal of the first NAND gate circuit 216 is connected to a fifth input terminal of the second OR gate circuit 168 through an inverter 218. With this arrangement, when the count-down operation is performed to a predetermined value which is set by the first switch circuit 214, the lower limiter circuit 210 stops the count-down operation. For example, when all of the switches of the first switch circuit 214 are all turned on, the lower limiter 210 stops the count-down operation when the count value is "00000001". Further when all of the switches of the first switch circuit 214 are all turned off, the lower limiter circuit 210 does not allow the count-down operation.

On the other hand, in the upper limiter 212, the second to fourth output terminals k, l and m of the first up/down counter 194 and the first to fourth output terminals j, k, l and m of the second up/down counter 196 are, respectively, connected to second to the eighth input terminals of a second NAND gate circuit 222, which has 8 input terminals, through a second switch circuit 220. The second switch circuit 220 is not described in detail, but it includes series circuits of inverters and changeover switches. In particular, each connecting wire is directly connected to one stationary contact of each changeover switch and the other stationary contact through the inverter. A movable contact of each changeover switch is connected to the corresponding input terminal of the second NAND gate circuit 222. Further, the first input terminal of the second NAND gate circuit 222 is connected to the second input terminal thereof. An output terminal of the second NAND gate circuit 222 is connected to a fifth input terminal of the third OR gate circuit 174 through an inverter 224. With the above arrangement, the count-up operation is performed to a predetermined value which is set by the second switch circuit, and the upper limiter circuit 212 interrupts the further count-up operation. For example, when all of the switches of the second switch circuit 220 are arranged so that one stationary contact is coupled to a corresponding movable contact in every switch, the second switch circuit 220 allows the count-up operation up to "11111110". On the other hand, when the switch circuit 220 is arranged so that the other stationary contact is coupled to the movable contact in every switch, the second switch circuit 220 does not allow the count-up operation once the count-down operation down to "00000001" is performed.

Further, the inverter controller 36 includes a so-called "power-on reset" circuit 226. In the power-on reset circuit 226, the DC power source 202 is connected to two input terminals of the third AND gate circuit 230 through a variable resistor 228. The two input terminals of the third AND gate circuit 230 are also grounded through a capacitor 232 and an on-off switch 234. The on-off switch 234 is usually set to the off status and is arranged to perform a mannual preset operation to be described later. To both terminals of the variable resistor 228 is connected a diode 236, a cathode of which is connected to the side of the DC power source 202, and which protects the third AND gate circuit 230. The diode 236 is arranged to receive the electric charge stored in the capacitor 232 when the DC power source 202 is not supplied, so that the charge which is stored in the capacitor 232 is not directly applied to the third AND circuit 230. The output terminal of the third AND gate circuit 230 is connected to the present input terminal PS of the first D type flip-flop 160, the clear input terminal CLR of the second D type flip-flop 162 directly, and load input terminals n of the first and second up/down counters 194 and 196 through an inverter 238.

When a power switch (not shown) of the DC power source 202 is turned on, that is, when the inverter controller 36 is turned on, the power-on reset circuit 226 makes current flow through the resistor 228 so that the capacitor 232 is charged. However, the current flow is limited by the variable resistor 228, so that a predetermined period of time is required for charging thwe capacitor 232. For this predetermined period of time, the signal of low level is supplied to the both input terminals of the third AND gate circuit 230 and the third AND gate circuit 230 outputs the signal of low level. That is, for this period of time, the signal of low level is supplied to the present input terminal PS of the first D type flip-flop 160 and the clear input terminal CLR of the second D type flip-flop 162. Therefore, independently of the input status of the data input terminal D, the signal of high level is output from the first output terminal $\overline{Q}$ of the first D type flip-flop 160 and the second output terminal $\overline{Q}$ of the second D type flip-flop 162 and the signal of low level is output from the second output terminal Q of the first D type flip-flop 160 and the first output terminal Q of the second D type flip-flop 162. Further, the signal of high level is supplied to the load input terminals n of the first and second up/down counters 194 and 196. In this manner, the first and second up/down counters 194 and 196 output signals in a predetermined preset condition for the predetermined period of time in which the capacitor 232 is charged after power is supplied, and these output signals are input to the D/A converter 198. Since the inverter controller 36 includes the power-on reset circuit 226, the inverter controller 36 does not perform irregularly, which is a characteristic of digital circuits, when power is supplied, so that a stable operating condition of the inverter controller 36 is accomplished.

When the charging of the capacitor 232 is completed, the signal of high level is supplied to the two input terminals of the third AND gate circuit 230. Therefore, the third AND circuit 230 outputs the signal of high level. The signal of high level is supplied to the preset input terminals PS and the clear input terminals CLR of the first and second D type flip-flops 160 and 162. In response to the clock pulses which are input to the clock input terminals CLK of the first and second D type flip-flops 160 and 162, the first and second D type flip-flops 160 and 162 output the signal, which is input to the input terminals D, from the output terminals Q, and output the signal which is input to the input terminals D and which is inverted, from the output terminals $\overline{Q}$. In response to the signal of high level which is output from the third AND gate circuit 230, the first and second up/down counters 194 and 196 are released from a predetermined mode of operation and output digital signals in accordance with the input statuses of the count-up input terminals f and count-down input terminals e.

The general mode of operation of the inverter controller 36 will be described with reference to the timing charts as shown in FIG. 5a to 5k.

Referring to FIGS. 5a and 5b, from time t1 to time t2, assume that the signal of high level (output A of high level) is supplied to the input terminal D type of the first D type flip-flop 160 and the signal of low level (output B of low level) is supplied to the input terminal D of the second D type flip-flop 162. Clock pulses are supplied from the clock generator 178 to the clock input terminals CLK of the first and second D type flip-flops 160 and 162, as shown in FIG. 5C. Therefore, the signal of high level is output from the first output terminal Q of the first D type flip-flop 160, as shown in FIG. 5d, and the signal of low level is output from the second output terminal $\overline{Q}$ of the first D type flip-flop 160, as shown in FIG. 5e. The signal of low level is output from the first output terminal Q of the second flip-flop 162 as shown in FIG. 5f, and the signal of high level is output from the second output terminal Q thereof, as shown in FIG. 5g. Therefore, the signal of high level is output from the first AND gate circuit 170 as shown in FIG. 5h, and the signal of low level is output from the second AND gate circuit 172 as shown in FIG. 5i. Since the signal of high level is supplied to at least one input terminal of the second and third OR gate circuits 168 and 174, the second and third OR gate circuits 168 and 174 constantly output the signal of high level, as shown in FIGS. 5j and 5k even if the clock pulses are input. Thus, the first and second up/down counter 194 and 196 maintain the output status. In this manner, when the output A is of high level and the output B is of low level, the inverter controller 36 does not change the content of the current control signal. Therefore, the blower maintains the current air quantity.

As shown in FIGS. 5a and 5b, from time t2 to time t3, assume that the signal of low level (output A of low level) is supplied to the input terminal D of the first D type flip-flop 160 and the signal of high level (output B of high level) is supplied to the input terminal D of the second D type flip-flop 162. The signal of low level is output from the first output terminal $\overline{Q}$ of the first D type flip-flop 160 as shown in FIG. 5d, and the signal of high level is output from the second ouput terminal $\overline{Q}$ of the first D type flip-flop 160 as shown in FIG. 5e. On the other hand, the signal of high level is output from the first output terminal Q of the second D type flip-flop 162 as shown in FIG. 5f and the signal of low level is output from the second output terminal $\overline{Q}$ of the second D type flip-flop 162 as shown in FIG. 5g. Therefore, the signal of low level is output from the first AND gate circuit 170 as shown in FIG. 5h, and the signal of low level is output from the second AND gate circuit 172 as shown in FIG. 5i. Since the signal of high level other than the clock pulse is not input to the input terminals of the second OR gate circuit 168, the second OR gate 168 outputs the clock pulse as shown in FIG. 5j. On the other hand, the signal of high level is input to at least one input terminal of the third OR gate circuit 174, so that the third OR gate circuit 174 constantly outputs the signal of high level as shown in FIG. 5k even if the clock pulse is input to the third OR gate circuit 174. Thus, the first and second up/down counters 194 and 196 are maintained in the count-down condition. In this manner, when the output A is of low level and the output B is of high level, the inverter controller 36 operates to change the content of the current control signal in order to perform the count-down operation. Therefore, the blower decreases the quantity of blown air.

As shown in FIGS. 5a and 5b, from time t3 to t4, assume that the signal of high level (output A of high level) is supplied to the input terminal D of the first D type flip-flop 160 and the signal of high level (output B of high level) is supplied to the input terminal D of the second D type flip-flop 162. The signal of high level is output from the first output terminal Q of the first D type flip-flop 160 as shown in FIG. 5d, and the signal of low level is output from the second output terminal $\overline{Q}$ of the first D type flip-flop 160 as shown in FIG. 5e. On the other hand, the signal of high level is output from the first output terminal Q of the second D type flip-flop 162 as shown in FIG. 5f and the signal of low level is output from the second output terminal $\overline{Q}$ of the second D type flip-flop 162 as shown in FIG. 5g. Therefore, the signal of low level is output from the first AND gate circuit 170 as shown in FIG. 5h and the signal of high level is output from the second AND gate circuit 172 as shown in FIG. 5i. Since the signal of high level is supplied to at least one input terminal of the second OR gate circuit 168, the second OR gate circuit 168 constantly outputs the signal of high level as shown in FIG. 5j even if the clock pulse is input. On the other hand, the signal of high level except for the clock pulse is not supplied to the input terminals of the third OR gate circuit 174, so that the third OR gate circuit 174 outputs the clock pulse as shown in FIG. 5k. The first and second up/down counters 194 and 196 start the count-up operation. In this manner, when the output A is of high level and the output B is of high level, the inverter controller 36 operates to change the content of the current control signal to perform the count-up operation. Therefore, the blower operates to increase the quantity of air.

Further, as shown in FIGS. 5a and 5b, from time t4 to time t5, assume that the signal of low level (output A of low level) is supplied to the input terminal D of the first flip-flop 160 and the signal of low level (output B of low level) is supplied to the input terminal D of the first D type flip-flop 162. The signal of low level is output from the first output terminal Q of the first D type flip-flop 160 as shown in FIG. 5d and the signal of high level is output from the second output terminal $\overline{Q}$ of the first D type flip-flop 160 as shown in FIG. 5e. On the other hand, the signal of low level is output from the first output terminal Q of the second D type flip-flop 162 as shown in FIG. 5f and the signal of high level is output from the second output terminal $\overline{Q}$ of the second D type flip-flop 162 as shown in FIG. 5g. Therefore, the signal of low level is output from the first AND gate circuit 170 as shown in FIG. 5h and the signal of low level is output from the second AND gate circuit 172 as shown in FIG. 5i. Since the signal of high level except for the clock pulse is not input to the input terminals of the second OR gate circuit 168, the second OR gate circuit 168 outputs the clock pulse as shown in FIG. 5j. On the other hand, since the signal of high level is supplied to at least one input terminal of the third OR gate circuit 174, the third OR gate circuit 174 constantly outputs the signal of high level as shown in FIG. 5k even if the clock pulse is input to the third OR gate circuit 174. The first and second up/down counter 194 and 196 start the count-down operation. The inverter controller 36 operates to change the content of the current control signal to perform the count-down operation. Therefore, the blower operates to decrease the quantity of air.

In this manner, logical results as shown in Table 2 are accomplished.

When the output A is of low level and the output B is of low level, the pieces of data which are indicated by the air quantity signal and the pieces of data which are indicated by the room thermostat signal are equal, that is, P=T. Therefore, basically, "hold" mode must be established. However, if the condition is held as it is, this is interpreted as the condition in which the output A is of low level and the output B is of low level according to Table 1. In particular, the blower operates to decrease the quantity of air even if the damper 48 is not fully opened, so the damper 48 cannot fully open. Therefore, in the above case, the content of the control signal defines the "count-down" mode. However, when the count-down mode continues even if the damper 48 is fully open, the air quantity gradually decreases, so that the output A changes from low level to high level. Then the output A of high level and the output B of low level are accomplished, resulting in the "hold" mode.

The mode of operation of the central air conditioning equipment with the above structure will be described.

In a condition in which the same quantity of air stream is distributed to four rooms by the blower 30, assume that the air stream which is distributed to one of the four rooms is interrupted. For example, when the damper 48 of the fourth terminal air quantity control unit 21 is closed, the air stream which is to be distributed to the room is redistributed to the other rooms through the first to third branched ducts 14, 15 and 16 so that the quantity of air stream corresponding to the branched ducts 14, 15 and 16 increases. Therefore, if the damper 48 remains in the current condition, the actual room temperature differs from the room temperature which is set by the setter. In the cooling mode, the room temperature decreases. On the other hand, the room temperature increases in the heating mode.

However, in the one embodiment, the air quantity detectors 42 of the first to third terminal air quantity control units 18, 19 and 20 make the corresponding propellers 44 rotate in accordance with the increase of the quantity of air stream which passes through the unit duct 40. Therefore, the level of the signal whose content is defined as P which indicates the actual quantity of air stream which passes through the unit duct 40 increases. In particular, the actual quantity of air which passes through the unit duct 40 and which is indicated by P is larger than the air quantity which is set by the setter and which is indicated by T. The signal of high level is supplied to the damper close circuit 118 through the second and sixth OP Amps. 82 and 106. The signal of low level is supplied to the damper open circuit 122. When the damper 48 is not fully closed, that is, when the lead switch 68 which functions as the completely-closed position detector is not turned on and the motor stopping circuit 134 is not operated, the damper close circuit 118 makes the motor 56 rotate so that the damper 48 accordingly rotates in the closing direction. The opening area of the respective unit ducts 40 of the first to third terminal air quantity control units 18, 19 and 20 is reduced, so that the air channel is damped. The closing operation of the damper 48 continues until the actual quantity of air stream which passes through the unit duct 40 and which is indicated by P becomes equal to the air quantity which is set by the setter and which is indicated by T, that is, until the signal of high level ceases to be supplied to the damper close circuit 118 through the second and sixth OP Amps. 82 and 106. Therefore, the first to third terminal air quantity control units 18, 19 and 20 adjust the quantity of air stream which passes the respective unit ducts 40 to the air quantity which is set by the setter.

Further, assume that the quantity of air stream which is distributed to one room is increased. For example, when the damper 48 of the fourth terminal air quantity control unit 21 is further opened, an additional quantity of air stream which is distributed to the room is redistributed from the total quantity of air stream which is to be distributed to the other rooms, so that the quantity of air which is distributed to the corresponding branched ducts 14, 15 and 16 is decreased.

However, in this embodiment, each (air quantity detector 42) of the first to third terminal air quantity control units 18, 19 and 20 makes the corresponding propellers 44 rotate in accordance with a decrease in the quantity of air stream which passes through the corresponding unit duct 40. Therefore, the actual quantity of air stream which passes through the unit duct 40 decreases. In particular, the actual quantity of air stream which passes through the unit duct 40 and which is represented by P becomes smaller than the air quantity which is set by the setter and which is represented by T. The signal of high level is thus supplied to the damper open circuit 122 through the fourth and seventh OP Amps. 88 and 112. On the other hand, the signal of low level is supplied to the damper close circuit 118. When the damper 48 is not fully open, that is, when the lead switch 66 which functions as the fully-open position detector 66 is not turned on and the motor stopping circuit 134 does not operate, the damper open circuit 122 makes the motor 56 rotate so that the damper 48 rotates in the opening direction. The opening area of each unit duct 40 of the first to third terminal air quantity control units 18, 19 and 20 increases. The opening operation of the damper 48 continues until the actual quantity of air stream which passes through the unit duct 40 which is indicated by P becomes equal to the air quantity which is set by the setter and which is indicated by T. Therefore, the actual quantity of air stream which passes through each unit duct 40 of the first to third terminal air quantity control units 18, 19 and 20 is maintained equal to the predetermined air quantity which is set by the setter. In this manner, the effect is accomplished in which a constant quantity of air stream passes through each unit duct 40 of the terminal air quantity control units 18 to 21.

The quantity of air stream which is supplied from the blower 30 becomes too large or too small as a whole when blowing of air stream to each room starts or terminates and the quantity of air stream is decreased or increased. When this occurs, the motor is controlled to supply air stream from the blower 30 at the minimum capacity. The control process of the inverter controller 36 will be described with reference to the flow chart shown in FIG. 6. The blower 30 is controlled so that the damper 48 of at least one terminal air quantity control unit among the terminal air quantity control units 18 to 21 is set to the fully-open position. This indicates that the satisfactory blowing rate is obtained with the minimum quantity of air stream or this current quantity of air stream is too small. On the other hand, when the damper 48 of any one of the terminal air quantity control units 18 to 21 is not set to the fully-open position, the quantity of air stream is too large.

In step 1, it is judged whether or not the damper 48 of at least one of the terminal air quantity control units 18 to 21 is fully open. If the damper 48 is not fully open, that is, if the output A is of low level and the output B is of low level, the quantity of air stream which is supplied from the blower 30 (blow rate) decreases. Therefore, the quantity of air stream which is distributed to the respective branched ducts 14 to 17 decreases. The respective dampers 48 of the terminal air quantity control units 18 to 21 are opened to maintain the air quantity which is set by the setter. The decrease in the quantity of air stream continues until it is judged that the damper 48 of at least one of the terminal air quantity control units 18 to 21 is fully open. When it is judged that at least one damper 48 is fully open as "YES" in step 1, the flow chart advances to step 2.

In step 2, when it is judged as "YES" that the air quantity which is set by the setter and which is indicated by T is larger than the actual quantity of air stream which passes through the unit duct 40, that is, when the output A is of high level and the output B is of high level, the blow rate of the blower 30 increases because this judgment indicates that the blow rate of the blower 30 is too small. Thereafter, the procedure from step 1 is again initiated. On the other hand, when it is judged as "NO" that the air quantity which is set by the setter and which is indicated by T is larger than the actual quantity of air stream which passes through the unit duct 40, the flow chart advances to step 3.

In step 3, if it is judged as "NO" that the air quantity which is set by the setter and which is indicated by T is equal to the actual quantity of air stream which passes through the unit duct 40, that is, when the output A is of low level and the output B is of high level, the blow rate of the blower 30 decreases because this judgment indicates that the blow rate of the blower 30 is too large. Thereafter, the procedure from step 1 is again initiated. On the other hand, when it is judged as "YES" that the air quantity which is set by the setter and which is indicated by T is equal to the actual quantity of air stream which passes through the unit duct 40 in step 3, that is, the output A is of high level and the output B is of low level, the blow rate of the blower 30 is maintained at the current value because this judgment indicates that the air quantity which is set by the setter and which is indicated by T is equal to the actual quantity of air stream which passes through the unit duct 40 according to the above control process, thus indicating that the blow rate of the blower 30 is set to the optimal minimum value.

In the first embodiment as described above, each of the terminal air quantity control units 18 to 21 automatically performs the control of the quantity of air stream constant by utilizing the air quantity detector 42 and the damper 48. Therefore, the quantity of air stream which is supplied to each room which corresponds to each of the supply openings 22 to 25 coincides with the desired air quantity which is set by the setter. In particular, the room temperature properly corresponds to the temperature which is set by the room temperature setter 74. Further, the terminal air quantity control units 18 to 21 detect the quantity of air stream after the air stream is subjected to channel resistance and the resultant pressure loss which occurs throughout the branched ducts 14 to 17. Therefore, this detection is not influenced by the length of the ducts.

Further, the terminal air quantity control units 18 to 21 are used as the sensors of the central control device 36. The blower 30 is controlled based on the signals from the terminal air quantity control units 18 to 21. Therefore, the quantity of air stream which is subjected to channel resistance which results in loss of air pressure is the basis for controlling the blower 30, thus resulting in operating control of the blower 30 with high precision. In this case, the inverter controller 36 preferably selects the terminal air quantity control unit in the worst condition among the four terminal air quantity control units 18 to 21, that is, the terminal air quantity control unit for which the air quantity is too small even if the damper 48 is full open. The operation of the blower 30 is controlled based on this terminal air quantity control unit in the worst condition. In this manner, the sensitivity of the control signal which is supplied to the blower 30 is good and the operating conditions of the blower 30 are easily changed. The inverter controller 36 makes the blower 30 operate at the optimal minimum blow rate, so that excessive drive force for the blower 30 is not required, resulting in low power consumption. Further, since the terminal air quantity control units 18 to 21 are used as the control sensors for operating the blower 30 in order to maintain a constant quantity of air stream, separate sensors are not required, resulting in a small number of required component parts.

The present invention is not limited to the particular embodiment as described above. Various changes and modifications may be made within the spirit and scope of the present invention.

Central air conditioning equipment according to another embodiment of the present invention will be described with reference to FIG. 7. The same reference numerals as indicated in the one embodiment denote the same parts in the second embodiment, and the description thereof will be omitted.

In the one embodiment, the fully-open position detector of the damper 48 comprises the lead switch 66 in order to detect directly the position of the damper 48. The limit switches may be also used for this purpose in the first embodiment. However, the fully-open position detector is not limited to these switches. An arrangement as shown in FIG. 7 may be utilized. In particular, a fully-open position detector 240 comprises a main body 248 which is divided into first and second pressure chambers 244 and 246 by a diaphragm 242. The first pressure chamber 244 is disposed on the upstream side of the unit duct 40 and communicates with the unit duct 40 through a first communicating path 250. On the other hand, the second pressure chamber 246 is disposed on the downstream side of the unit duct 40 and communicates with the unit duct 40 through a second communicating path 252. A distortion guage 254 is attached to the diaphragm 242. The distortion guage 254 detects the distortion of the diaphragm 242 which is distorted by a pressure difference between the area before the damper 48 and a the area after the damper 48 within the unit duct 40. Further, the distortion guage 254 outputs an electric signal in correspondence with the degree of the distortion of the diaphragm 242. When the damper 48 is set in the fully-open position, the pressure difference between the first and second pressure chambers 244 and 246 is minimized. This condition is detected as the fully-open condition by the distortion gauge 254.

Figure 7:
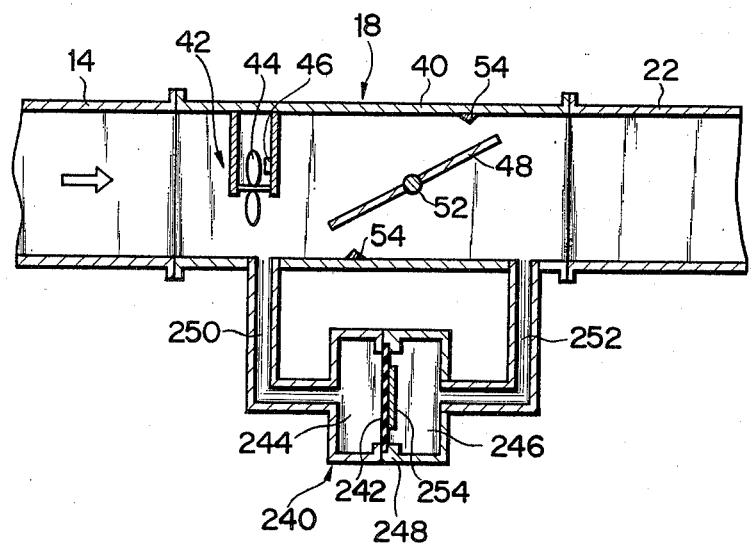
FIG. 7 is a sectional view of a terminal air quantity control unit which is taken out of central air conditioning equipment according to another embodiment of the present invention.

The diaphragm 242 as shown in FIG. 7 may be replaced by a piston.

What we claim is:

1. Central air-conditioning equipment which performs air-conditioning for a plurality of rooms, comprising:

an air-conditioner which includes a heat exchanger and a blower for blowing air, the heat of which is exchanged in said heat exchanger;

a duct which distributes the air blown from said blower to said room;

a plurality of terminal air quantity control units which are installed in order to communicate with the rooms, respectively, and which control the quantities of the air which are distributed to the rooms through said duct, each of said terminals air quantity control unit including a main body through which the air passes, an air quantity sensor which detects a flow rate of the air which passes through said main body, a damper which is disposed in said main body and which is movable between a first position where the main body is open to a maximum state, and a second position where the main body is completely closed, a drive mechanism which drives said damper, a setter which is disposed in a corresponding room and which sets the quantity of the air which is distributed to the corresponding room, and a unit controller which controls said drive mechanism in order to match the quantity of the air which actually passes to the quantity of air which is set based on the air quantity detected by said air quantity sensor and the air quantity set at said setter; and an air quantity control device, attached to said air conditioner, which controls said blower to reduce the blown air quantity when none of the dampers of the terminal air quantity control units are in the first position until at least one of said dampers reach said first position and then, controls the blower to increase the air flow in the terminal air quantity control unit in which said damper has reached the first position, when the air quantity detected by the air quantity sensor is less than the air quantity set by the setter, and which controls said blower to maintain the blown air quantity when the air quantity detected by said air quantity sensor is equal to the air quantity set by said setter.

2. Central air conditioning equipment according to claim 1, wherein each of said unit controllers includes a first comparator which outputs a signal of first level when the quantity of air which is set is smaller than the detected quantity of air and which outputs a signal of second level when the quantity of air which is set is larger than the detected quantity of air, a second comparator which outputs the signal of first level when the quantity of air which is set is equal to the detected quantity of air and which outputs the signal of second level when the quantity of air which is set is not equal to the detected quantity of air, and first and second output means, respectively, connected to said first and second comparators, which output a signal which is input thereto when said damper is set in the first position and which constantly output the signal of first level when said damper is not set in the first position; and said air quantity control device includes a logical operating circuit which receives the signals output from said first and second output means and which outputs an operation signal, and a converting circuit which is connected to said logical operating circuit and which outputs an instruction signal which defines a blow rate of said blower in response to the operation signal, said logical operating circuit outputting the operation signal for reducing the blow rate when the signal of first level is supplied from said first output means, outputs the operation signal for maintaining the blow rate of said blower when the signal of second level is supplied from said first output means and the signal of first level from said second output means, and outputs the operation signal for increasing the blow rate of said blower when the signal of second level is supplied from said first output means and the signal of second level is supplied from said second output means.

3. Central air conditioning equipment according to claim 2, further comprising a motor mechanism which drives said blower.

4. Central air conditioning equipment according to claim 3, wherein said motor mechanism includes an induction motor and an inverter which regulates a rotational frequency of said induction motor.

5. Central air conditioning equipment according to claim 4, wherein said converting circuit includes an up/down counter which outputs a digital signal in response to the operating signal which is output from said logical operating circuit and a D/A converter which is connected to said up/down counter and which outputs an analog signal corresponding to the digital signal, so that said inverter regulates the rotational frequency of said induction motor in accordance with the analog signal from said D/A converter.

6. Central air conditioning equipment according to claim 5, wherein said air quantity control device includes a power-on reset circuit which is connected to said up/down counter, said power-on reset circuit operating in such a manner that said up/down counter outputs a predetermined digital signal for a predetermined period of time after power is supplied.

7. Central air conditioning equipment according to claim 5 wherein said air quantity control device comprises a count-down limiter circuit and a count-up limiter circuit which are connected to said up/down counter, said count-down limiter circuit defining a lower limit of the digital signal which is output from said up/down counter and said count-up limiter circuit defining an upper limit of the digital signal which is output from said up/down counter.

* * * * *